United States Patent [19]
Looney et al.

[11] 3,876,718
[45] Apr. 8, 1975

[54] PRODUCTION OF ETHYNYL BENZENES

[75] Inventors: Jesse M. Looney; Robert A. Fuller, both of Big Spring, Tex.

[73] Assignee: Cosden Oil & Chemical Company, Big Spring, Tex.

[22] Filed: Sept. 1, 1972

[21] Appl. No.: 285,903

[52] U.S. Cl............................................ 260/668 R
[51] Int. Cl............................................. C07c 1/30
[58] Field of Search ............................... 260/668 R

[56] References Cited
UNITED STATES PATENTS
3,204,004  8/1965  Sexton ......................... 260/668 R
3,542,888  11/1970  d'Ostrowick et al............ 260/668 R

*Primary Examiner*—C. Davis

[57] ABSTRACT

Ethynylbenzene compounds having the formula wherein

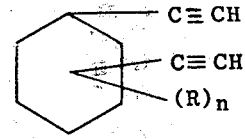

R is a substituent to the benzene nucleus selected from the group consisting of hydrogen, alkyl radicals having 1 to 3 carbon atoms and ethynyl radicals, and $n$ is the number of such substituents and is 0 or an integer of 1 through 4, are formed in high yield by dehydrohalogenating of the corresponding di(dihaloethyl)-benzene compound in which the halogen is chlorine or bromine, in an aqueous lower n-alkanol solution of an alkali metal hydroxide, containing a minor proportion of about 2 to 25% by volume of water, at a moderate dehydrohalogenation reaction temperature of about 160° to 275°F.

8 Claims, No Drawings

PRODUCTION OF ETHYNYL BENZENES

This invention relates to preparation of mono- and diethynylbenzene compounds of the formula:

(a) 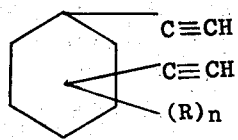

wherein R is a substituent to the benzene nucleus selected from the group consisting of alkyl radicals having 1 to 3 carbon atoms and ethynyl radicals, and $n$ is the number of such substituents and is an integer of 1 through 4. If R is an alkyl radical, it may be methyl, ethyl, propyl or isopropyl. These compounds are particularly useful in the preparation of polymers having good heat stability.

This application is related to a copending application, Ser. No. 765,665, filed Oct. 7, 1968, now U.S. Pat. No. 3,542,888, in which the Inventors are Pierre Marie Joseph Ghislain de Radzitsky d'Ostrowick and Alain Joseph Guillaume de Roocker (LAB–050) and whose assignee is a division, the Assignee of the present invention and this application being a companion division, of the same parent company, Petrofina, S.A.

It was commonly proposed in the art to dehydrohalogenate haloalkanes to form corresponding ethynyl compounds, particularly the aliphatic alkynes, by various procedures, the most common of which was the use of a dry saturated lower alkanolic solution of caustic, typically caustic potash or caustic soda, the former being preferred for its greater solubility in the dry alkanol. The alkanol was thought to be necessarily dry, so much so that it was equally common to effect the absolute dryness of the alkanol by reacting the alkanol with the alkali metal to form thereof an alkali metal alkoxide of the lower alkanol, the excess dry alkanol serving as solvent. That procedure was dictated to insure rapid reaction as well as significant yields; and, equally important, to allow the alkali halide formed to remain as an insoluble suspension. It also was proposed in U.S. Pat. No. 3,204,004 to dehydrohalogenate a, B-dibromoethyl benzene to form phenylacetylene in the presence of a secondary alcohol having a lower caustic solubility and some water was added to solubilize the excess caustic. However, when such method is applied to the di(dibromoethyl)benzene, the yield of diethynylbenzene is lower than desired.

It was desirable for large scale reactions to put the caustic in solution in a separate external vessel and then pump it into the dehydrohalogenation reactor at the appropriate time. For that practice using anhydrous lower alkanol the base precipitates out with slight cooling as it enters the reactor and it must be handled as a slurry. With slight changes sometimes the base settles out before it reaches the reactor. A consequence of this is low yields and erratic results.

According to the present invention, it is found that a lower n-alkanol containing from 2 to 25% by volume of water, preferably 5 to 15% by volume of water, will react to dehydrohalogenate a di(dihaloethyl)benzene to form the corresponding diethynylbenzene compound in very high yields. The aqueous lower n-alkanol will dissolve much more base, allowing a desired concentration of the base solution to be stored at room temperature and still be easily handled and pumped as a solution. The overall system becomes more consistent and the base solution may be stored without separation of alkali in high concentrations and introduced into the reactor to react in the dehydrohalogenation of the starting di(dihaloethyl)benzene to form an ethynylbenzene compound of the formula as shown above.

In its broadest aspect, the present method is directed to the production of diethynylbenzene compounds as defined above, by dehydrohalogenation of the corresponding di(dihaloethyl) benzene compounds with alkali hydroxide dissolved in aqueous lower n-alkanol containing 2 to 25% by volume of water.

The corresponding starting di(dihaloethyl) benzene compound before dehydrohalogenation has the formula:

(b) 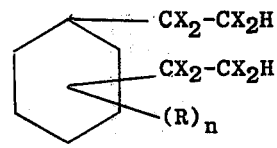

wherein R and $n$ are the same as in formula (a) above, and X is hydrogen or halogen, and wherein at least 2 Xs of each of the substituents to the benzene nucleus are halogen groups.

More specifically, according to the present invention, the dehydrohalogenation of the di(dihaloethyl)benzene compound is effected by adding the di(dihaloethyl)benzene compound to the lower n-alkanol such as methanol, ethanol or a propanol containing 2 to 25% by volume of water and a substantial excess, at least a 20% excess of the stoichiometric quantity of alkali needed to react with the halogen acid formed, preferably, at least 50% excess. The reaction is exothermic and may exotherm to 230° to 275°F but is maintained within the range of 160° to 210°F during most of the reaction. The pressure ranges from atmospheric to the autogenous pressure developed in a closed reactor maintained in this temperature range after initiating the reaction at ambient temperature. The reaction takes place exothermically over a period of several hours, usually 1 to 4 hours. After termination, the reactor is cooled to below the boiling point of the alcohol. The suspended alkali metal halide is filtered and washed with a mixture of alkanol or mixture thereof with other solvents, generally followed by a second washing with an inert solvent, i.e., carbon tetrachloride. The filtrate is then diluted with water to separate the diethynylbenzene compound which is finally extracted from the aqueous alkanol with an inert solvent such as halogenated hydrocarbons, i.e., carbon tetrachloride, or a hydrocarbon, i.e., benzene, heptane, cyclohexane, etc.

For initiating the reaction, the alkali metal hydroxide is dissolved in the aqueous lower n-alkanol, containing 2 to 25% by volume of water, usually 5 to 15% by volume of water, in quantity to provide a desired excess of alkali metal hydroxide in the reaction mixture.

The alkali may consist of any of the alkali metal hydroxides. However, sodium hydroxide, potassium hydroxide or lithium hydroxide are preferred in the practice of the present invention. The alkali metal halide formed in the reaction separates into an insoluble suspension in the alkali solution in the aqueous n-alkanol and after cooling, it is separated by filtration as stated. The filter cake of alkali halide, as stated, is washed with a mixture of about equal parts of a dry lower alkanol and a solvent for the ethynylbenzene, typically carbon tetrachloride, trichloroethane or a hydrocarbon which may be readily separated from the ethynylbenzene by distillation. The filtered alkanolic solution of the diethynylbenzene may then have the reaction product diethynylbenzene extracted with organic solvent i.e. halogenated hydrocarbon or hydrocarbon solvent, following which the solvent may be flashed off in an evaporator and the ethynylbenzene product distilled in a vacuum for ultimate recovery.

Inasmuch as in a batchwise reaction, bromine is most easily handled in a dropwise liquid halogenation of the corresponding starting divinylbenzene compounds, that halogen adding quite cleanly, bromine is most frequently used from the practical standpoint. However, if desired, chlorine may be used as well. The alkali bromide or chloride salt may be recovered as described in the above-identified copending application. The operation of this method is quite surprising for preparation of diethynylbenzene compounds of the above formula since the intermediate alpha-halo divinylbenzene simultaneously formed during the dehydrohalogenation is so highly unstable that it tends to polymerize to form polymeric tars by other known methods for forming of alkynes. Moreover, it is particularly unexpected in view of the prior art, that dehydrohalogenation could take place in higher yield in a lower n-alkanol which contains substantial quantities of water, than when using a non-primary alcohol.

In addition the reaction being carried out at elevated temperatures, it would appear that the ethynylbenzene compound generally high boiling and produced at the high exothermic temperatures developed in the reactor, would tend to polymerize in the reactor. It is unexpected that the product forms under these unusual conditions and in the presence of water in high yield of these diethynylbenzene products.

The following examples illustrate the practice of this invention:

EXAMPLE I 1050 ml. of methanol and 150 ml. of water are charged to a three liter, stainless steel closed reactor equipped with a stirrer, thermometer, cooling coil and pressure gauge. 565 grams of 85% flake caustic (12 mols of NaOH) were then added. The reactor was closed and stirring was initiated. The heat of solution raised the temperature to 176°F. The solution was then cooled to 150°F and the reactor was opened. The solution was found to be cloudy but all of the caustic remained in solution. To this solution was then added 854 grams (1.9 mols) of meta bis(1,2-dibromoethyl)benzene. The reactor was closed and stirring was resumed. The initial dehydrobromination reaction exothermed to 205°F. The reaction was then cooled to 180°F and reaction was allowed to continue for three hours at the above temperature. The mixture was then cooled to 145°F and the reactor was opened. The sodium bromide precipitate was filtered and washed with 600 ml. methanol and 500 ml. of water. The diethynyl benzene was then extracted from the aqueous methanol solution with CCl₄. The CCl₄ was then flashed off the diethynyl benzene with a rotary evaporator and the remaining diethynyl benzene was then distilled under vacuum to yield 144 grams of meta-diethynyl benzene. This is a theoretical yield of 60.2% meta-diethynyl benzene or an actual weight yield of 16.9%. Following the procedure of this example, 6-methyl meta-diethynylbenzene and 1,4-diethynyl- 2,5-dimethylbenzene are similarly prepared by dehydrohalogenation of their correspondingly substituted di(dihaloethyl)benzene compounds.

EXAMPLE II

The reactor as described in Example I was charged with 1740 ml. of isopropyl alcohol, 260 ml. of water and 282 grams of flake caustic, as described in Example I. The reactor was then heated to 235°F to dissolve the caustic and was then cooled to 150°F and opened. 400 grams of meta bis(1,2-dibromoethyl)benzene were added and the reactor was closed and heated to 230°F and 30 psig for 5 hours. The reactor was then cooled back to 150°F, opened and filtered. The sodium bromide was washed with isopropyl alcohol and benzene and 2500 ml. of water were added to the filtrate. The meta-diethynylbenzene was extracted with benzene from the aqueous alcohol solution and the benzene was then stripped off in a rotary evaporator. The meta-diethynylbenzene was further purified with a vacuum distillation. A yield of 48 grams of meta-diethynylbenzene were recovered. This represented an actual weight yield of approximately 12%.

EXAMPLE III

To 40 gallons of methanol and 5 gallons of water (11% of water) was added 100 pounds of flake caustic in a stirred vessel. The solution was allowed to cool to ambient temperature and substantially all of the caustic remained in solution. A 100 gallon closed and jacketed reactor, equipped with a stirrer and temperature controls, was charged with 124 pounds (125 mols) of a mixture of meta- and para-bis(1,2-dibromoethyl)benzene. This material was heated to 130°F. The previously prepared aqueous methanol solution of NaOH was then pumped into the reactor. The exotherm was controlled at 175°F and the reaction was run at that temperature for 3 hours. The mixture was then cooled to 130°F and pumped through a centrifuge for removal of the sodium bromide. The cake was washed with methanol and carbon tetrachloride, the filtrate then being diluted with 75 gallons of water. The diethynylbenzene was extracted with CCl₄. Upon analysis the carbon tetrachloride extract was found to contain 20.8 pounds of mixed meta- and para-diethynylbenzene, which is a 60% theoretical yield that can be recovered by distillation. The actual weight yield was approximately 16.8%.

Comparison of Examples I and III above, with Example II, demonstrates the unexpectedly higher yields obtained using the aqueous lower n-alcohols than the yield obtained using the non-primary alcohol. Of course, higher yields also result in few by-products.

Partly dehydrochlorinated dihalo alkylbenzene compounds boil closer to the final diethynylbenzene compounds than the corresponding partly dehydrobrominated compounds, and close fractionation of volatiles from the reaction product is therefore advisable when dehydrohalogenating dichlorethylbenzene compounds. While a substantial stoichiometric excess of alkali metal hydroxide is used herein, this may range from at least 20%, preferably 50% excess of the stoichiometric quantity of alkali metal needed to react with the halogen acid formed. In general, the alkali content of the alkanol solution will vary with water content and the specific alkanol, methanol generally being preferred for its greater alkali solubility.

Certain modifications will occur to those skilled in the art. The reaction mixture may have the diethynylbenzene compound removed by extracting with various volatile solvents which are immiscible with said aqueous alkanol; typically, any inert solvent such as the halogenated hydrocarbons, i.e., halogenated methanes or ethanes such as chloroform, carbon tetrachloride, perchloro ethylene, trichloroethane, tribromoethane, or such as hydrocarbon solvents, i.e., benzene, toluene, heptane, cyclohexane, or the like. The inert solvent and the ethynylbenzene are preferably separated by distillation, generally at reduced pressure.

EXAMPLE IV

To further demonstrate the unexpected superiority of the lower n- alkanols in the dehydrohalogenation of di(dihaloethyl)benzenes to form diethynylbenzene, three runs were carried out under substantially the same conditions using methanol in run No. 1, ethanol in run No. 2 and isopropanol in run No. 3. In each run, the reactor was charged with the aqueous alcohol and flake caustic and then stirred and heated to dissolve the caustic. To this was then added melted meta bis(1,2-dibromoethyl)benzene. The reaction mixtures were allowed to exotherm and then cooled and maintained at a substantially constant temperature for the remainder of the reaction. Upon cooling, the sodium bromide was filtered off and washed with a corresponding alcohol and carbon tetrachloride. The meta- diethynylbenzene was extracted with carbon tetrachloride which was then flashed off in a rotary evaporator. The remaining diethynylbenzene was purified by vacuum distillation. The following table presents the quantities of reactants, conditions of reaction and results for each of runs 1 through 3.

|  | Run No. 1 | Run No. 2 | Run No. 3 |
|---|---|---|---|
| Alcohol, ml. | 1190 | 1190 | 1190 |
| Water, ml. | 210 | 210 | 210 |
| Caustic, grams | 575 | 575 | 575 |
| M-bis(dibromoethyl) benzene, grams | 807 | 804 | 828 |
| Exotherm, Max °F | 235 | 230 | 217 |
| Controlled temp °F | 192 | 195 | 194 |
| Time of reaction, hrs. | 3 | 3 | 3 |
| Yield % | 84 | 63 | 48 |

From the above table, it is apparent that yields are substantially higher when employing the lower n- alkanols than when using the lower non-primary alcohols. For example, when using methanol, the yield is almost double that obtained when using isopropanol under substantially the same conditions.

What is claimed is:

1. The process of dehydrohalogenating a di(- dihaloalkyl)benzene compound wherein the dihalo halogen is selected from the group consisting of chlorine and bromine, comprising contacting said compound with an aqueous lower n- alkanol of one to three carbon atoms having dissolved therein a stoichiometric dehydrohalogenating excess of an alkali metal hydroxide and controlling the reaction during the majority of the reaction period at a temperature of 160° to 210°F.

2. The process of producing ethynylbenzene compounds having the formula

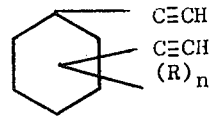

wherein R is a substituent to the benzene nucleus selected from the group consisting of alkyl radicals having 1 to 3 carbon atoms and ethynyl radicals and $n$ is the number of such R substituents and is 0 or an integer of 1 through 4, comprising dehydrohalogenating a di(dihaloethyl)benzene compound having the formula

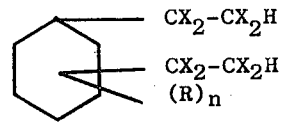

wherein R and $n$ are as defined above, and X is a member of the group consisting of hydrogen, chlorine and bromine, and wherein at least 2 X's of each of the substituents to the benzene nucleus are halogen groups in the presence of an aqueous solution of a lower n- alkanol of 1 to 3 carbon atoms containing a substantial stoichiometric dehydrohalogenating excess of an alkali metal hydroxide.

3. The process as defined in claim 2 wherein the alkali metal hydroxide is present in at least approximately a 10% excess of the stoichiometric dehydrohalogenating excess.

4. The process as defined in claim 2 wherein the alkali metal hydroxide is present in at least approximately a 50% excess of the stoichiometric dehydrohalogenating excess.

5. The process as defined in claim 2 wherein the lower alkanol is methanol.

6. The process as defined in claim 2 wherein the lower alkanol is ethanol.

7. The process as defined in claim 2 wherein the lower alkanol is n-propanol-1.

8. The method as defined in claim 2 wherein the diethynylbenzene compound formed is separated by extracting the diethynylbenzene compound from the reaction mixture with an organic solvent, removing said solvent from said extract by distillation and distilling the diethynyl benzene product under reduced pressure.

* * * * *